Nov. 22, 1927.

C. L. KESSLER 1,649,903

FURNITURE JOINT SECURING MEANS

Filed Oct. 21, 1924

Inventor

CHARLES L. KESSLER.

By A. B. Bowman
Attorney

Patented Nov. 22, 1927.

1,649,903

UNITED STATES PATENT OFFICE.

CHARLES L. KESSLER, OF SAN DIEGO, CALIFORNIA.

FURNITURE-JOINT-SECURING MEANS.

Application filed October 21, 1924. Serial No. 744,900.

My invention relates to joint securing means for furniture, and the objects of my invention are: first, to provide a means for quickly and securely connecting and maintaining two separate members of a piece of furniture so that a close rigid joint is provided without gluing, if desired; second, to provide a joint means of this class in which several separate members of furniture may be readily connected together without the use of glue, ordinary wood screws, nails or the like; third, to provide a furniture joint means of this class in which the separate members of furniture are rigidly secured together and which may be readily adjusted for taking up any looseness in case the wood shrinks by drying or the like; fourth, to provide a joint means of this class which is applicable for use for joining different kinds and classes of furniture; fifth, to provide a novel means of joining two members of furniture together; sixth, to provide a means of this class whereby the separate members of furniture may be readily separated, and seventh, to provide a means of this class which is very simple and economical of construction, durable, easy to operate, positive in its action, and which will not readily deteriorate or get out of order.

Figure 1:
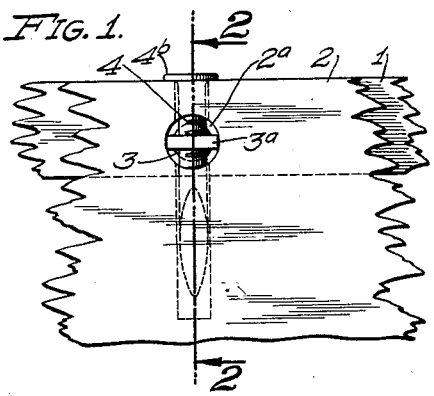
Figure 2:
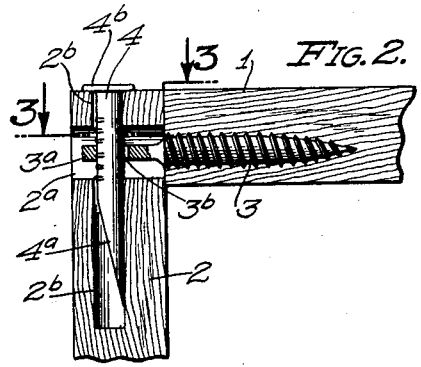
Figure 3:
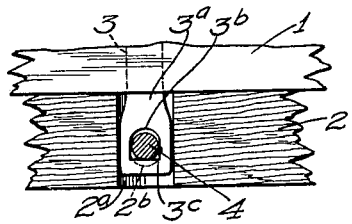
Figure 4:
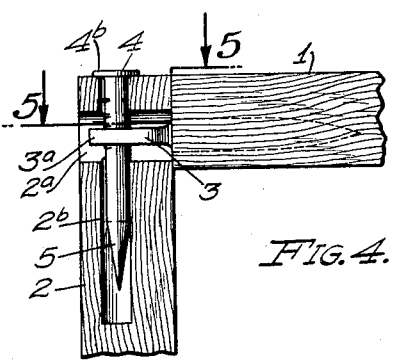
Figure 5:
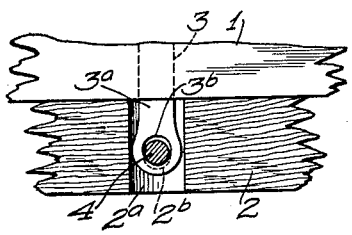

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of a joint of two members, showing my means for connecting the members together; Fig. 2 is a sectional view through 2—2 of Fig. 1; Fig. 3 is a sectional view on the line 3—3 of Fig. 2; Fig. 4 is a partial sectional and partial elevational view of the securing means in a slightly modified form, and Fig. 5 is a sectional view on the line 5—5 of Fig. 4.

Like characters of reference refer to similar parts and portions throughout the several views of the drawings.

The furniture member 1, furniture member 2, combined screw and eye member 3, and the wedge member 4, constitute the principal parts and portions of my furniture joint securing means.

The member 1 may be any form of furniture member desired for joining to another member. The member 2 may also be of any form desired, except that it is provided with a round hole $2^a$ transversely therethrough and with another hole $2^b$, which extends through and intersects with the hole $2^a$, as shown best in Fig. 2 of the drawings. Screwed into the member 1 is the member 3, which is provided with screw threads similar to the ordinary wood screw, and it is provided with a flat end $3^a$ which is provided with an orifice $3^b$ therethrough. In the preferred form of construction the one side of this orifice is straight, as shown at $3^c$ in Fig. 3 of the drawings. This member 3 is screwed into the member 1 the desired distance; then the member 2 is placed in juxtaposition therewith; then a wedge shaped member 4 is inserted into the hole $2^b$, the thin tapering end passing through the orifice $3^b$ in the member $3^a$, the member 4 being provided with a tapered flattened end $4^a$ and with a head $4^b$, preferably made of an ordinary wire nail, with a portion cut away on a bias, as shown best in Fig. 2 of the drawings. This member 4 is driven into the hole $2^b$ through the hole $3^b$ of the member 3, the tapered portion $4^a$ forcing the members 1 and 2 rigidly together and holding them in such position. If the joint should loosen slightly because of shrinkage of the material, the member 4 can be removed and the member 3 turned inwardly a one-half revolution or a whole revolution, depending upon the amount of shrinkage, and the member 4 again driven into position and the joint tightened. It will be noted that several of these devices or joint securing means may be used at spaced intervals from six inches to a foot apart, as desired.

In the modified form of construction shown in Figs. 4 and 5 of the drawings, the construction is the same except the orifice in the member $3^a$ is round instead of flat sided. The member 4 is provided with a round tapered point 5.

Though I have shown and described a particular construction, combination and arrangement of parts and portions and a certain modification thereof, I do not wish to be limited to this particular construction, combination and arrangement nor to the modification, but desire to include in the scope of my invention the construction, combination and arrangement substantially as set forth in the appended claims.

Having thus described my invention, what I claim as new and desire to secure by Letters Patent is:

1. In a furniture joint securing means, a furniture member, a screw member mounted in said furniture member provided with an extended reduced portion with a hole transversely therethrough, another furniture member with a hole therein adapted to extend over the extended end of said screw member, and a thrust member provided with a tapered end adapted to be driven into said second mentioned furniture member through the hole in said screw member for wedging said furniture members together.

2. In a furniture joint securing means, a screw member provided with a transverse hole therein adapted to be screwed into a furniture member, and a wedge shaped thrust member adapted to be driven into another furniture member and engage the side walls of the hole in said screw shaped member for drawing said furniture members together.

3. In a furniture joint securing means, a furniture member, a means secured thereto and extending from one side thereof provided with a transverse hole through the extended portion, another furniture member positioned over said extended portion, and a tapered thrust means mounted in said furniture member in engagement with the side wall of the hole in said extended portion for drawing said furniture members together.

4. In a furniture joint securing means, a furniture joint member provided with an extended member extending from one side thereof provided with a transverse hole therethrough and another furniture member provided with a hole therein in alinement with the hole in said extended member, and a tapered ended thrust means adapted to fit into said hole and engage the side walls of the hole in said extended member and when forced therein draw said furniture members together.

5. In a furniture joint securing means, a furniture member, a screw member mounted in said furniture member and extending with one end therefrom, said end having a hole transversely therethrough, another furniture member positioned against the first mentioned furniture member and provided with a hole through which the extended portion of the screw member extends, and a wedge member driven into the second furniture member and through the transverse hole in said screw member for wedging said furniture members together as the wedge member is forced into the second furniture member.

6. In a furniture joint securing means, a furniture member, an eye member secured at one end in said furniture member and extending with its opposite end therefrom, said opposite extended end being provided with a transverse hole, another furniture member positioned against said first furniture member and provided with an opening adapted to receive freely the extended end of said eye member, and a wedge means extending into said second furniture member and through the hole of said eye member adapted to wedge said furniture members together when said wedge means is forced into said second furniture member.

In testimony whereof, I have hereunto set my hand at San Diego, California, this 10th day of October, 1924.

CHARLES L. KESSLER.